(12) United States Patent
Prather

(10) Patent No.: US 6,733,038 B1
(45) Date of Patent: May 11, 2004

(54) PROTECTIVE COVER HAVING NON-SLIP SURFACE AND PROCESS FOR MAKING THE SAME

(76) Inventor: Michael R. Prather, Rte. 4, Box 1331, Starke, FL (US) 32091

(*) Notice: Subject to any disclaimer, the term of this patent is extended or adjusted under 35 U.S.C. 154(b) by 0 days.

(21) Appl. No.: 09/898,590

(22) Filed: Jul. 2, 2001

Related U.S. Application Data

(60) Provisional application No. 60/215,279, filed on Jun. 30, 2000.

(51) Int. Cl.$^7$ ................................................. B60R 1/00
(52) U.S. Cl. .................... 280/770; 296/136.07; 150/166
(58) Field of Search ..................... 280/770; 296/136.01, 296/136.02, 136.07; 150/166; 52/DIG. 14

(56) References Cited

U.S. PATENT DOCUMENTS

| | | | |
|---|---|---|---|
| 3,276,895 A | | 10/1966 | Alford |
| 3,298,712 A | * | 1/1967 | Greenstadt .................. 280/770 |
| 3,661,673 A | | 5/1972 | Merriam |
| 3,844,605 A | * | 10/1974 | Payne ......................... 296/135 |
| 4,068,859 A | | 1/1978 | Dittman |
| 4,328,274 A | * | 5/1982 | Tarbutton .................... 428/149 |
| 4,413,700 A | | 11/1983 | Shiratsuchi |
| 4,469,256 A | | 9/1984 | McEwen |
| 4,867,216 A | * | 9/1989 | McKee ........................ 150/166 |
| 4,930,832 A | * | 6/1990 | Shelton ....................... 296/107 |
| 4,938,522 A | * | 7/1990 | Herron et al. ............... 296/136 |
| 5,056,817 A | * | 10/1991 | Fuller .......................... 280/770 |
| 5,137,594 A | * | 8/1992 | Asada et al. ............. 256/307.4 |
| 5,475,951 A | | 12/1995 | Litzow |
| 5,488,981 A | * | 2/1996 | Burkhart ...................... 150/166 |
| 5,490,549 A | | 2/1996 | Biette |
| 5,511,822 A | | 4/1996 | Wolanski |
| 5,531,500 A | * | 7/1996 | Podvin ........................ 296/152 |
| 5,686,509 A | * | 11/1997 | Nakayama et al. ......... 523/201 |
| 5,787,655 A | | 8/1998 | Saylor, Jr. |
| 5,817,399 A | | 10/1998 | Kalman |
| 6,062,629 A | | 5/2000 | Gentile |
| 6,176,450 B1 | * | 1/2001 | Bergman ..................... 244/1 R |
| 6,209,559 B1 | * | 4/2001 | Richardson ................. 150/167 |
| 6,254,170 B1 | * | 7/2001 | Farmer et al. .......... 150/166 X |
| 6,481,478 B2 | * | 11/2002 | Mueller ................. 280/770 X |

OTHER PUBLICATIONS

US Patent Application Publication 2002/0072932—dated Jun. 13, 2002.*
Printout from Internet Web Site www.motorcyclegoodies2.com—dated 3/2/3.*
Printout From Internet Web Site www.mycycles.com—dated Jun. 6, 2000.*

* cited by examiner

Primary Examiner—Bryan Fischmann
(74) Attorney, Agent, or Firm—Richard S. Vermut; Rogers Towers, P.A.

(57) ABSTRACT

A protective cover having a non-slip surface for mounting to a motorcycle frame area is shaped to conform to the motorcycle frame area and includes an interior surface formed from rubber and an exterior surface formed from an epoxy mixture to which a granulated material is applied for providing the non-slip surface. The protective cover has a carbon fiber layer formed between the interior surface and the exterior surface, and the carbon fiber layer is affixed to the interior surface and the exterior surface by epoxy resin material. Holes are formed through the interior surface, the exterior surface, and the carbon fiber layer for inserting fasteners therethrough to mount the protective cover to the motorcycle frame area, and, when the protective cover is mounted to the motorcycle frame area, the interior surface is adjacent to the motorcycle frame area to prevent the protective cover from scratching the motorcycle frame area.

25 Claims, 4 Drawing Sheets

PROTECTIVE COVER HAVING NON-SLIP SURFACE AND PROCESS FOR MAKING THE SAME

CROSS-REFERENCE TO RELATED APPLICATIONS

This application claims the benefit of U.S. Provisional Application No. 60/215,279, filed Jun. 30, 2000, hereby incorporated by reference in its entirety.

FIELD OF THE INVENTION

This invention relates generally to non-slip and non-skid surfaces and more specifically to a protective cover having a non-slip surface, and a method for making such a device, with application in many fields such as frame guards for motorcycles.

BACKGROUND OF THE INVENTION

The invention relates to the field of non-slip surfaces. The product and process of this invention may be used in any industry in which a non-slip surface has utility. One specific industry is the motorcycle racing industry. Motorcycle drivers travel on challenging terrains which include obstacles such as sharp turns, jumps, and moguls. These conditions create varying extreme forces against the driver requiring him or her to continually maintain control of the bike and his or her body. Drivers maintain control of their cycles with their hands, legs and feet. The cyclist's hands grip the steering handles while the cyclist's feet push off against pegs, extending outward from the each side of the race bike. Cyclists maintain their stability by squeezing their legs against the sides of the cycle's frame. Motorcycles for this application are generally available on the market and manufactured by companies that include Honda, Suzuki, Yamaha and Kawasaki.

Cyclists often attempt to improve their stability by improving the grip between the cyclist's legs and the cycle's frame. Traditionally, this was accomplished by the cyclist pressing his or her legs against the motorcycle's frame. This method has several disadvantages. The cycle's frame, usually made of metal, is slippery and not easily gripped. Repeated slippage and kicking of the cyclist's legs and boots against the frame causes damage to the frame's surface in the form of deformation and removal of paint and protective coatings. Consequently, the frame's raw material is exposed to the elements resulting in a more rapid corrosion and deterioration of the motorcycle frame.

The prior art demonstrates that some motorcycle manufacturers and owners have attempted to solve this problem by placing a protective cover, known as a frame guard, over those areas of the frame that come into contact with the cyclist. These frame guards are ordinarily made of aluminum, carbon or plastic. While they solve the problem of protecting the frame from damage and deterioration, these frames are difficult to grip, provide little friction and hinder the ability of cyclists to maintain lower body support and control.

In response to this problem, many drivers alter the exterior surface of the frame guards in order to increase friction and prevent slippage. This is accomplished by applying a grip tape or bed liner coating to the exterior surface of the frame guard or directly to the motorcycle frame. Each of these methods increases friction and driver stability. However, they are very temporary solutions. Both methods quickly wear down and typically separate from the frame guard after two or less uses. Some cyclists replace the grip tape or bed liner several times during a single outing. Additionally, the appearance of partially removed grip tape and liners give the motorcycle an unkempt appearance.

As previously explained, the disclosed product and process provide beneficial use in any field of application where an anti-slip or anti-skid surface has application. The disclosure's focus on this invention's application to a frame guard for motorcycles is not intended as any limitation on the invention's application to these other fields. Throughout this disclosure, the invention and process may be applied to any other type of surface or object capable of bonding according to the product and process described below.

DETAILED DESCRIPTION OF A PREFERRED EMBODIMENT

The invention is a protective cover, also known as a frame guard, which contains an exterior surface with increased friction. The exterior side of the cover is comprised of a special surface that is similar in texture to sandpaper, thereby enabling a cyclist to maintain his or her grip on the cycle's frame. The exterior surface is durable so that it maintains its gripping surface over a substantial portion of the cycle's useful life. The interior surface, which makes contact with the cycle's frame, is comprised of a treated surface having a rubber-like texture which reduces wear on the cycle's frame. The invention may be designed as a replacement frame guard for the original equipment frame guard provided by the manufacturer. Alternatively, it may be designed to fit motorcycles that have no frame guard. The invention may be produced in several colors to conform to each motorcycle manufacturer's factory colors. Likewise, the frame guard provides the motorcycle with a neat and orderly appearance.

Figure 1:
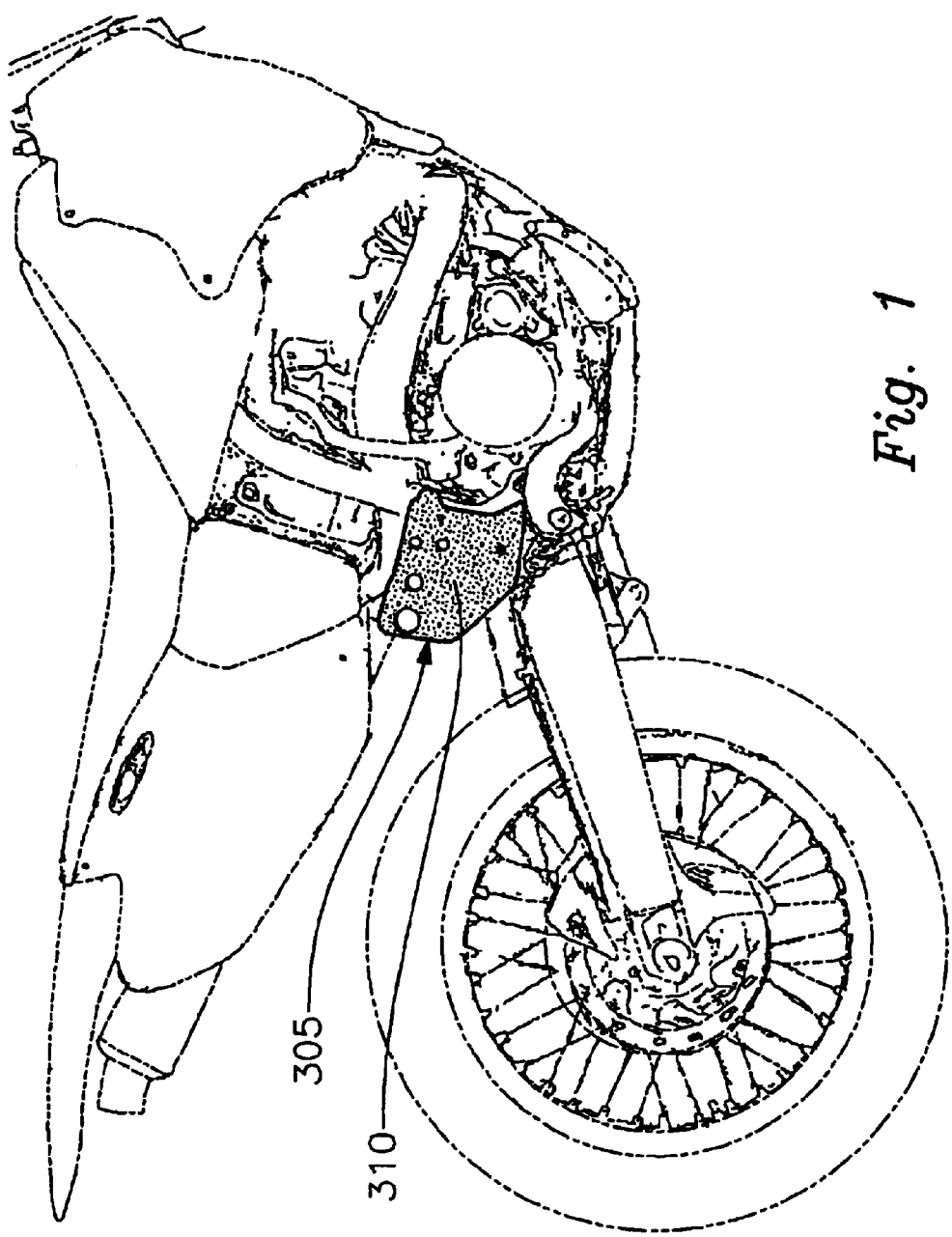
FIG. 1 is a top view of a frame guard manufactured in accordance with the present invention and installed on a motorcycle.
Figure 2:
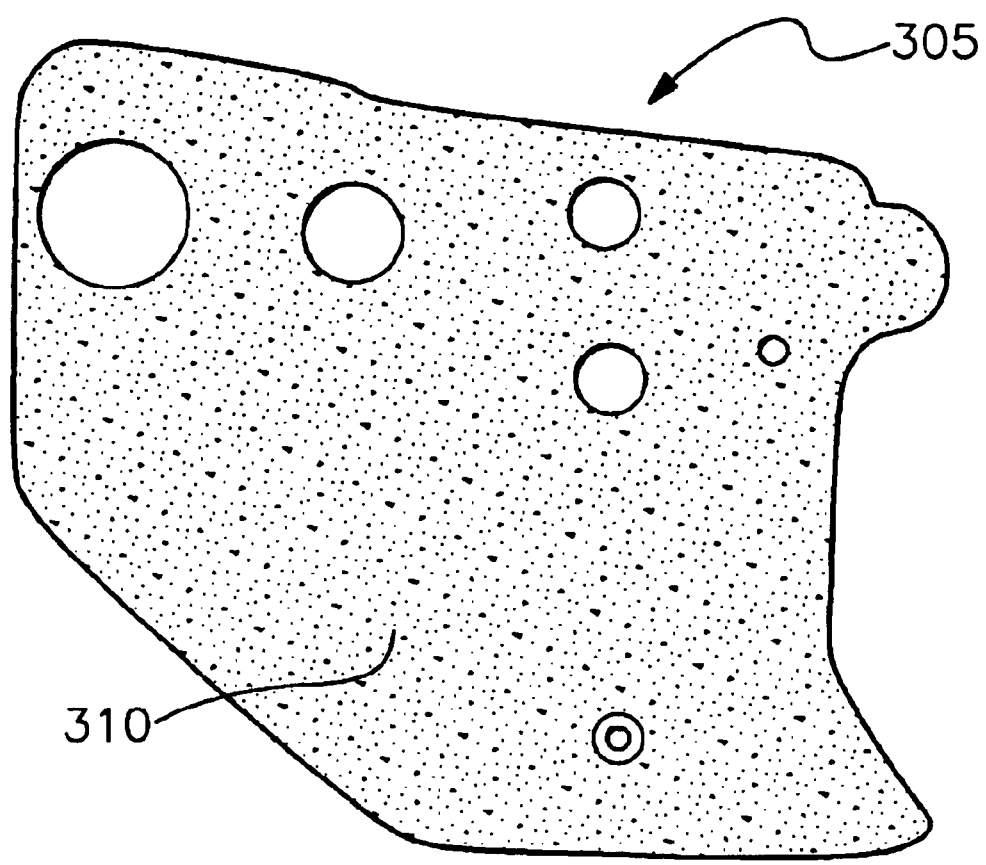
FIG. 2 is a top view of a frame guard manufactured in accordance with the present invention.

Referring to FIG. 1, there is depicted a frame guard, attached to a motorcycle, that is the subject of this invention. The actual shape, size and appearance of the frame guard is dependant upon the shape and style of the motorcycle's frame. Ideally, the frame guard should meet the same size specifications and be the same color as the original equipment manufacturer's frame guard or the motorcycle. FIG. 2 illustrates a frame guard manufactured in accordance with a preferred embodiment of the present invention as it appears detached from a motorcycle.

Figure 3A:
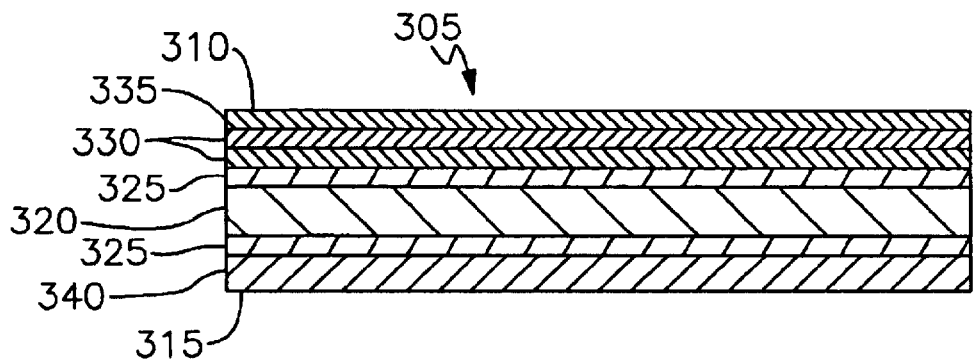
FIGS. 3A and 3B are side views of frame guards that are manufactured by processing layers of various materials in accordance with the present invention.
Figure 3B:
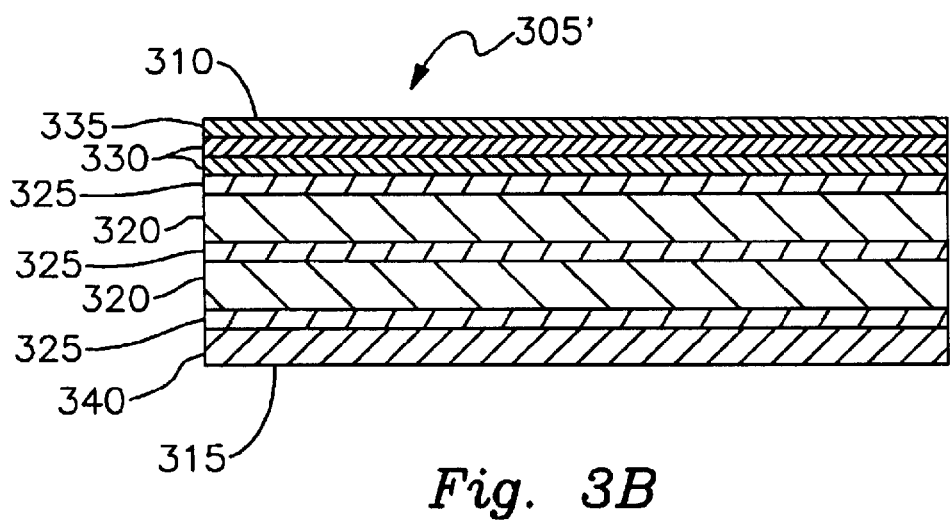

The frame guard of this invention is comprised of several layers. FIG. 3 depicts two cross sectional views of a frame guard 305, 305'. FIG. 3A shows a frame guard 305 having a single layer of carbon fiber fabric, and FIG. 3B shows a similar frame guard 305' having multiple layers of carbon fiber fabric. Each frame guard includes two sides: an exterior or outer side 310, including the exterior or outer surface, also known as the face side, with increased friction for gripping by a cyclist; and an interior or inner side 315, including an interior or inner side rubber surface that rests against the cycle frame. The frame guard is comprised of several layers. The number of layers will vary depending upon the desired thickness of the frame guard. The frame guard itself is comprised of a carbon fiber fabric permeated with epoxy resin. These carbon fiber fabric layers 320 are sandwiched between the frame guards' interior and exterior surfaces 310, 315. The thickness of each frame guard may be increased by adding additional layers of the permeated carbon fiber fabric. Each layer of carbon fiber fabric is impregnated with and separated on each side by a layer of a mixture of resin and hardener 325.

With respect to the exterior side 310 of the frame guard, the exterior surface is comprised of layers 330 of a mixture of resin, hardener, pigment, and a granular powder such as BONDEX® manufactured by William Zinsser Company, Inc. The granular powder gives the exterior surface its added friction. The exterior side's surface has a rough and uneven texture with multiple ridges, valleys, and bumps of varying height, depth, size and shape. The surface appears as would any surface sprinkled with a granular powder, grit or other abrasive type particles. The pigment is mixed with resin and hardener and colors the frame guard. This resin and hardener mixture is used to bond the granular powder and pigment to the exterior surface of the frame guard's outermost layer, which is comprised of the previously discussed resin and hardener mixture used for bonding with and impregnation into the carbon fiber fabric. Thus, the granular powder is bonded to the epoxy resin of the carbon fiber fabric layer. Two or more additional layers of the resin, hardener, pigment and granular powder may be applied over the previous layer to increase the exterior surface's roughness. However, too many layers may cause the exterior surface of the frame guard to chip or crack when flexed, and motorcycle frame guards may flex during use. The outermost layer of the exterior side is a layer 335 of resin, hardener and pigment that covers the exterior side of the mixed layer 330 of resin, hardener, pigment and granular powder. This outer layer 335 provides additional hardness, protection and improves longer wear. Two or more additional layers of this coating may also be added to increase the protection of the exterior surface of the face side.

The interior side of the frame guard is coated with a clear rubber coating 340 for protecting the frame of the motorcycle. This clear rubber coating 340 is bonded directly to the innermost layer 325 of resin and hardener that coats the inner most carbon fiber layer 320. FIG. 2 further illustrates mounting means in the form of holes through the interior surface, the exterior surface, and the carbon fiber layer for inserting fasteners therethrough to mount the protective cover to the motorcycle frame area.

The process of manufacturing frame guards in accordance with the present invention is comprised of several steps. These steps are as follows:

1. Select the proper mold (as described below in greater detail).
2. Clean the mold-thoroughly.
3. Wax the mold with mold release wax.
4. Cut carbon fiber material to pattern size.
5. Mix epoxy resin and hardener.
6. Apply a coat of epoxy mixture on the face of the mold. Insert cut carbon material, making sure each ply is wet with the epoxy mixture.
7. Match back of mold to face mold.
8. Clamp molds together using "C" clamps, making sure there is enough pressure to allow air and excess epoxy mixture to escape.
9. Cure part in mold at 150° F. for forty-five (45) minutes.
10. Let mold cool.
11. Extract part from mold.
12. Post-cure part at 200° F. for sixty (60) minutes.
13. Select proper drill jig.
14. Drill holes and cut and trim part to specified size.
15. Smooth edges with sandpaper to remove fray and debris.
16. Clean the part with lacquer thinner (or equivalent).
17. Scuff the face (front) side of part.
18. Clean face side (front) with lacquer thinner.
19. Mix epoxy resin and hardener.
20. Add pigment to epoxy resin and hardener mixture.
21. Apply a thin coat of mixture (epoxy resin, hardener, and pigment) to surface of face (front) side of part. Keep the mixture out of the mount holes.
22. Pour abrasive powder (such as a granular powder, sand, or similar material) onto epoxy.
23. Cure @ 150° F. for forty-five (45) minutes.
24. Repeat steps 19–23.
25. Repeat steps 19–21, curing at 150 deg F. for 45 minutes.
26. Sand edges of part.
27. Clean out mount holes.
28. Apply rubber coat on surface of back side of part.

Figure 4:
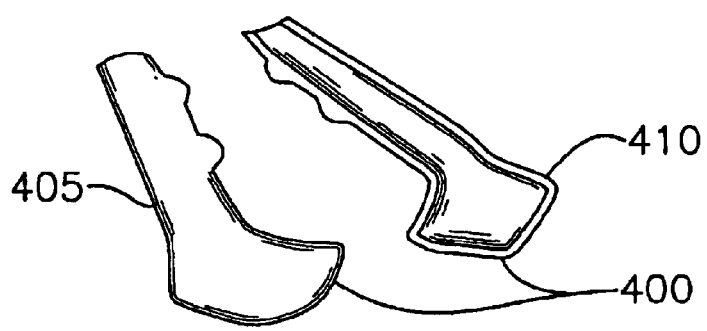
FIG. 4 shows mold pieces that comprise a mold for making a frame guard in accordance with the present invention.

The frame guard of the present invention is preferably manufactured using a composite molding process. A two-piece composite mold is formed to match the shape of the original manufacturer's frame guard or of a newly designed frame guard to fit a motorcycle. A photograph of such a composite mold 400 is depicted in FIG. 4. A first mold piece 405 is a concave inverted image of the desired frame guard shape. The second mold piece 410 is an inverted convex image of the first mold piece 405. The second mold piece 410 is placed within the first mold piece 405 to compress the molded object.

In the first step of the process, carbon fiber fabric and epoxy resin are molded into the shape of the frame guard. Initially, the first and second mold pieces 405, 410 are thoroughly cleaned using conventional means in order to remove any dust and debris. The inside of each mold piece 405, 410 is prepared for molding using means known by those skilled in the art. Such preparation means may include coating and buffing interior surfaces of the mold pieces 405, 410 with a substance such as a mold release wax to prevent bonding and sticking of the molded object to each piece 405, 410 of the mold. The mold release wax is generally a wax polishing compound such as PARTELL® Paste No. 2 manufactured by Rexco.

The first mold piece 405 is then coated with a mixture of resin and hardener to form a layer 325 of epoxy resin mixture within the mold piece 405. The resin may be of any commercially available type. Preferably, the resin has a viscosity that is approximately 600 centipoise, and it is beneficial for the resin to be relatively thin to effectuate the run over of excess epoxy through compression of the mold. One such brand of resin is Raka 127™ manufactured by Raka Inc. Other types of resins, such as polyester and vinylester resins, may instead be used.

The hardener may be of any commercially available type that may be mixed with the resin. A preferred type is a hardener, such as RAKA 631™ manufactured by Raka Inc., having a five-to-one mix ratio with a viscosity of 300 centipoise. The mixture of resin and hardener should have a proportion of five parts resin to one part hardener by volume.

A first carbon fiber fabric layer 320 is placed into the first mold piece 405 over the pool of molding epoxy resin mixture 325. The carbon fiber fabric is made of a carbon composite. A preferred fabric is 19.5 ounce 12K 2×2 twill carbon fabric. Such carbon fabrics are available from Carbon Composites Company. Other materials such as fiber glass, pre-pregnated carbon fiber, Kevlar fiber, and Syntex fiber may alternatively be used. The layer 320 of carbon fiber fabric is of sufficient size to completely fit in the mold piece 405 and be shaped into the form of the frame guard.

Figure 5:
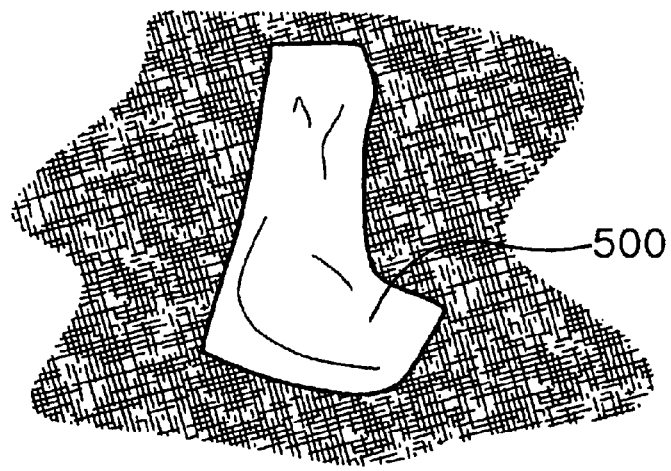
FIG. 5 is a top view of a pattern used in forming portions of the material included in the frame guard in accordance with the present invention.

The carbon fiber fabric may be cut to the desired size and shape using a pre-defined pattern. FIG. 5 shows a photograph of such a pre-defined pattern 500. A layer 325 of molding epoxy resin mixture is then applied over the first layer 320 of carbon fiber fabric. A sufficient amount of molding epoxy resin mixture should be added to assure the carbon fiber fabric is thoroughly wetted and impregnated.

To increase the thickness of the frame guard, additional layers 320 of carbon fiber may be overlaid into the mold piece 405, and each then covered by another layer 325 of molding epoxy resin mixture. Generally, each additional layer of carbon fiber increases the thickness of the frame guard. The actual thickness of each carbon fiber layer varies depending upon the type of fabric utilized. The final layer of carbon fiber fabric placed into the mold is covered by the molding epoxy resin mixture.

The wax coated second mold piece 410 is then seated into the first mold piece 405 and compressed. The compression should be of at least a minimum force to extract all air and excess molding epoxy resin mixture from the mold object 400. The air and excess molding epoxy resin escape from the compressed mold using conventional techniques such as drilled openings in the molds. Pressure in the range of fifteen (15) to thirty (30) pounds per square inch may suffice. A "C" type clamp may be used to effectuate the compression. The compressed mold is cured for a period long enough to harden the frame guard for removal from the mold. This may be accomplished by curing the compressed mold for forty-five (45) to sixty (60) minutes at 150° F. Heat lamps may be used to maintain the desired temperature. The mold may alternatively be cured at room temperature, in which case additional curing time would likely be necessary. The frame guard is then removed from the mold.

Once extracted from the mold, the frame guard is re-cured in an oven. This second curing process is performed to harden the frame guard and assure that it will remain hard above temperatures that may be reached during actual use conditions. Specifically, the molding epoxy resin mixture contains certain properties such that, once cured to a high enough temperature, the molding epoxy resin mixture will not later soften unless again raised above that temperature. The frame guard is therefore re-cured to a higher temperature than the temperature to which the frame guard may be exposed under actual working conditions. For use of the frame guard in motorcycle racing, this may be accomplished by curing the frame guard at 200° F. for sixty (60) minutes.

Figure 6:
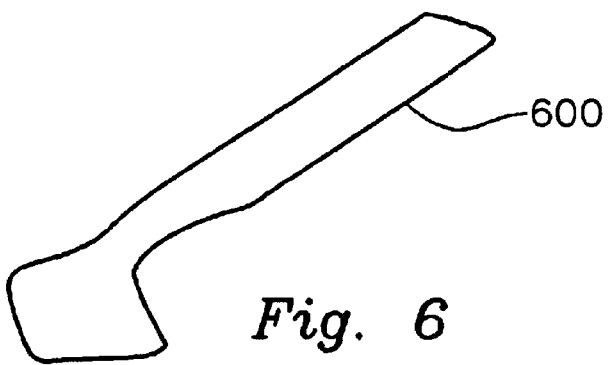
FIG. 6 depicts a drill jig suitable for use in the manufacture of a frame guard in accordance with the present invention.

The re-cured frame guard is then cut and trimmed to meet the design specifications, such as those of the original equipment manufacturer's frame guard. The frame guard may be cut using conventional drilling methods. A drill jig matching the proper frame guard specifications may be used to guide the cutting. A photograph of such a drill jig 600 is depicted in FIG. 6. During this phase, mount holes and other insertions may be drilled into the frame guard for attaching the frame guard to the motorcycle.

Once the frame guard has been cut to specifications, the surfaces and edges are smoothed, using conventional methods such as sanding with sandpaper, to remove any fraying and unevenness. All surfaces of the frame guard are then cleaned using a lacquer thinner. One preferred type of lacquer thinner is a high grade fast evaporating lacquer thinner. This cleaning removes any residual wax from the molding portion of the process and any dust and particles that may remain as a result of the cutting and smoothing processes.

During the next phase of the process, the rough exterior surface is added to the frame guard. First, the surface of the exterior side of the frame guard, consisting of the outermost layer of molding epoxy resin mixture, is scuffed. The purpose of the scuffing is to create an uneven surface with crevices, pits, and valleys to increase the bonding of the surface to a granular material and an epoxy resin. This may be accomplished by either sanding or sandblasting the exterior surface. The scuffed exterior surface is cleaned with the lacquer thinner.

Once the scuffed surface is cleaned, a series of steps are undertaken to affix a granular powder to the exterior surface of the frame guard. Another resin and hardener mixture, which may be of any commercially available type, is mixed with pigment. Preferably, the resin has a viscosity that is approximately 1000 centipoise. One brand of such resin is RAKA 900 H.P.™ manufactured by Raka Inc. Other types of resins, such as polyester and vinylester resins, may also be used.

The hardener may be of any commercially available type that may be mixed with the resin. A preferred type is a hardener having a five-to-one mix ratio with a viscosity of 300 centipoise such as RAKA 631™ manufactured by Raka Inc. The mixture of resin and hardener should have a proportion of five parts resin to one part hardener by volume. This resin has a higher viscosity than the resin used in the molding epoxy resin mixture.

The pigment may be a liquid plastic colorant such as Part #347 Yellow Color Pigment manufactured by Fibre Glast Developments Corp. The pigment may be added by slowly stirring the pigment into the epoxy resin mixture. The mixture of epoxy resin and pigment may be of any proportion necessary for the epoxy resin to reach the desired color. For example, a lower amount of pigment mixed into the epoxy resin mixture will result in a lighter colored mixture and, consequently, a lighter colored frame guard. Mixing greater amounts of pigment with the epoxy resin mixture will create darker colors and a more opaque frame guard.

When the desired color is obtained, a thin layer of the pigment-epoxy resin mixture is spread over the surface of the exterior side of the frame guard. This thin coating enables the granular powder to bond to the exterior surface of the face side of the frame guard. The pigment-epoxy resin mixture should not be applied over any mount holes in the frame guard used for mounting or attaching the frame guard to a motorcycle or other object because, during use of the frame guard, any screws, bolts, or other mechanisms used for tightening the frame guard to the motorcycle could place undue pressure on the hardened pigment-epoxy resin mixture, thereby causing chipping, flaking, or cracking. It can be seen that avoiding this type of wear will prolong the useful life of the anti-skid surface of the face side of the frame guard. The pigment-epoxy resin mixture additionally gives the exterior side of the frame guard its desired color.

A gritty granular powder, such as a sand finish additive, is then sprinkled over the wet pigment-epoxy resin mixture. The greater the amount of powder scattered on the surface, the greater the non-skid properties of the frame guard. A preferred brand of the granular powder is BONDEX® powder, which is manufactured by William Zinsser Company, Inc. This granular powder provides the front surface with a sand-texture effect, thereby increasing friction. Alternatively, any other type of particle, such as sand, capable of creating an abrasive effect may be used, or a solid piece having the desired anti-skid surface could be used instead of the granular powder. Any type of anti-skid surface capable of bonding with the resins and hardeners may be utilized. Preferably, such anti-skid surfaces would be capable of impregnation with an epoxy resin mixture to enhance its bond to the surface.

Once the granular powder is applied to the pigment-epoxy resin mixture, creating layer 330 (FIGS. 3A and 3B), the frame guard is again cured by heating at 150° F. for forty-five (45) minutes. Once the frame guard has been cured, the above-listed series of steps for affixing the granular powder to the front surface of the frame guard are repeated to add, if desired, additional layers of granular powder. The step of curing by heating at 150° F. for forty-five (45) minutes is also repeated. It will be appreciated, however, that repeating this process may not be necessary if the initial layer of granular powder and pigment-epoxy resin mixture results in sufficient anti-skid properties. One of ordinary skill in the art will also understand that more than two layers of granular powder and pigment-epoxy resin mixture may be applied to create a thicker granular powdered surface or to increase the anti-skid effects. However, too many layers of granular powder may cause the surface to crack when flexed, so use of such additional layers may be appropriate in situations in which the anti-skid surface is applied, for example, to a relatively rigid object.

Next, another thin layer 335 of the pigment-epoxy resin mixture is spread over the surface of the exterior side of the frame guard in the same manner as previously applied, avoiding mount holes in the frame guard. This final layer 335 is added to form an additional protective coating for the exterior surface. The frame guard is then cured for the final time by heating at 150° F. for forty-five (45) minutes. Additional layers of this pigment-epoxy resin mixture may be added if a thicker protective surface is desired. Such layers may be added by repeating these last steps described for applying the layer of pigment-epoxy resin mixture and by repeating the curing process. Subsequently, the edges of the frame guard are sanded to a smooth finish to remove any granular powder. The mount holes are then cleaned to remove any debris and material.

The final step comprises applying a rubber coating 340 onto the surface of the inner side of the frame guard. The rubber coating 340 is preferably a flexible clear rubber compound for heavy duty application. The rubber may be, for instance, PLASTIDIP™ #F-720 rubber manufactured by P.D.I., Inc. Alternatively, the final layer may be of another type of material that provides a soft or smooth texture in order to minimize scratching and wear of external objects or surfaces, such as the motorcycle surfaces, that come into contact with the back side of the frame guard during its use. The rubber application process may be repeated if additional layers of the rubber coating are desired.

The above-described process may also be utilized to apply granular powder in order to form the grip and no-skid surface on objects and surfaces other than a frame guard. The portion of the process described above which describes the process of affixing a granular powder to a surface may be applied to such other surfaces and objects, provided the intended surface or object is capable of bonding with the epoxy resin mixture described above. The bonding of the granular powder may also be made with surfaces and objects other than carbon fiber. Likewise the addition of the pigment may not be necessary if the color of the finished surface or object is not important.

While this invention has been described in terms of several embodiments, it is contemplated that alterations, permutations, and equivalents thereof will become apparent to one of ordinary skill in the art upon reading this specification in view of the drawings supplied herewith. It is therefore intended that the invention and any claims related thereto include all such alterations, permutations, and equivalents that are encompassed by the spirit and scope of this invention.

What is claimed is:

1. A protective cover having a non-slip surface for mounting to a motorcycle frame area, the protective cover shaped to conform to the motorcycle frame area and comprising:

an interior surface formed from rubber, wherein, when the protective cover is mounted to the motorcycle frame area, the interior surface is adjacent to the motorcycle frame area;

an exterior surface formed from an epoxy mixture to which a granulated material is applied for providing the non-slip surface, the exterior surface including a pigment for coloring the exterior surface;

a carbon fiber layer formed between the interior surface and the exterior surface, wherein the carbon fiber layer is affixed to the interior surface and the exterior surface by epoxy resin material, wherein holes are formed through the interior surface, the exterior surface, and the carbon fiber layer for inserting fasteners therethrough to mount the protective cover to the motorcycle frame area.

2. A protective cover having a non-slip surface for mounting to a vehicle frame area, the protective cover formed from a process comprising the steps of:

a) providing a mold of the vehicle frame area, the mold comprising first and second mold pieces;

b) mixing epoxy resin and hardener to form an epoxy mixture;

c) applying the epoxy mixture to an interior surface of the first mold piece;

d) positioning carbon fiber material into the first mold piece;

e) applying the epoxy mixture to the carbon fiber material;

f) securing the first and second mold pieces together to compress cover material therein;

g) curing the cover material within the mold;

h) removing the cover material from the mold;

i) applying the epoxy mixture to a first side of the cover material;

j) applying granulated material to the epoxy mixture applied to the first side of the cover material to form an exterior surface of the protective cover; and, k) applying a non-abrasive material to a second side of the cover material to form an interior surface of the protective cover.

3. The protective cover of claim 2, wherein the epoxy mixture is applied to the carbon fiber material prior to positioning the carbon fiber material into the first mold piece.

4. The protective cover of claim 2, wherein the epoxy mixture is applied to the carbon fiber material subsequent to positioning the carbon fiber material into the first mold piece.

5. The protective cover of claim 2, wherein, during the curing step, the cover material is subjected to a temperature higher than room temperature.

6. The protective cover of claim 2, wherein, during the curing step, the cover material is subjected to a temperature of 150 degrees Fahrenheit for forty-five minutes.

7. The protective cover of claim 2, wherein the process further comprises the steps of:

l) subsequent to the removing step, curing the cover material for an additional period of time; and m) subsequent to applying the granulated material in step (j), curing the protective cover.

8. The protective cover of claim 7, wherein, during steps (l) and (m), the cover material is subjected to a temperature higher than room temperature.

9. The protective cover of claim 8, wherein, during step (l), the cover material is subjected to a temperature higher than temperatures to which the protective cover will be exposed during use.

10. The protective cover of claim 2, wherein the process further comprises the step of:

l) applying a pigment to the exterior surface of the protective cover to color the exterior surface.

11. The protective cover of claim 10, wherein the pigment is mixed with the epoxy mixture prior to applying the epoxy mixture to the first side of the cover material.

12. The protective cover of claim 2, wherein the process further comprises the step of:

l) subsequent to removing the cover material from the mold, drilling mounting holes through the cover material for subsequent mounting of the protective cover to the vehicle frame area.

13. The protective cover of claim 2, wherein the processes further comprises the steps of:

l) prior to step (a), waxing interior surfaces of the first and second mold pieces;

m) subsequent to steps (h) and (j), sanding the protective cover; and n) prior to step (i), scuffing the first side of the cover material.

14. A method for manufacturing a protective cover having a non-slip surface for mounting to a vehicle frame area, the method comprising the steps of:

a) providing a mold of the vehicle frame area, the mold comprising first and second mold pieces;

b) mixing epoxy resin and hardener to form an epoxy mixture;

c) applying the epoxy mixture to an interior surface of the first mold piece;

d) positioning carbon fiber material into the first mold piece;

e) applying the epoxy mixture to the carbon fiber material;

f) securing the first and second mold pieces together to compress cover material therein;

g) curing the cover material within the mold;

h) removing the cover material from the mold;

i) applying the epoxy mixture to a first side of the cover material;

j) applying granulated material to the epoxy mixture applied to the first side of the cover material to form an exterior surface of the protective cover; and k) applying a non-abrasive material to a second side of the cover material to form an interior surface of the protective cover.

15. The method of claim 14, wherein the epoxy mixture is applied to the carbon fiber material prior to positioning the carbon fiber material into the first mold piece.

16. The method of claim 14, wherein the epoxy mixture is applied to the carbon fiber material subsequent to positioning the carbon fiber material into the first mold piece.

17. The method of claim 14, wherein, during the curing step, the cover material is subjected to a temperature higher than room temperature.

18. The method of claim 14, wherein, during the curing step, the cover material is subjected to a temperature of 150 degrees Fahrenheit for forty-five minutes.

19. The method of claim 14, further comprising the steps of:

l) subsequent to the removing step, curing the cover material for an additional period of time; and m) subsequent to applying the granulated material in step (j), curing the protective cover.

20. The method of claim 19, wherein, during steps (l) and (m), the cover material is subjected to a temperature higher than room temperature.

21. The method of claim 20, wherein, during step (l), the cover material is subjected to a temperature higher than temperatures to which the protective cover will be exposed during use.

22. The method of claim 14, further comprising the step of:

l) applying a pigment to the exterior surface of the protective cover to color the exterior surface.

23. The method of claim 22, wherein the pigment is mixed with the epoxy mixture prior to applying the epoxy mixture to the first side of the cover material.

24. The method of claim 14, further comprising the step of:

l) subsequent to removing the cover material from the mold, drilling mounting holes through the cover material for subsequent mounting of the protective cover to the vehicle frame area.

25. The protective cover of claim 14, further comprising the steps of:

l) prior to step (a), waxing interior surfaces of the first and second mold pieces;

m) subsequent to steps (h) and (j), sanding the protective cover; and n) prior to step (i), scuffing the first side of the cover material.

* * * * *